Oct. 14, 1969     J. F. FOX     3,472,417
METHOD OF MAKING WINDOW CAN CLOSURES
Filed Sept. 23, 1966     2 Sheets-Sheet 1

INVENTOR
JAMES F. FOX

BY *Mason, Porter, Diller & Brown*
ATTORNEYS

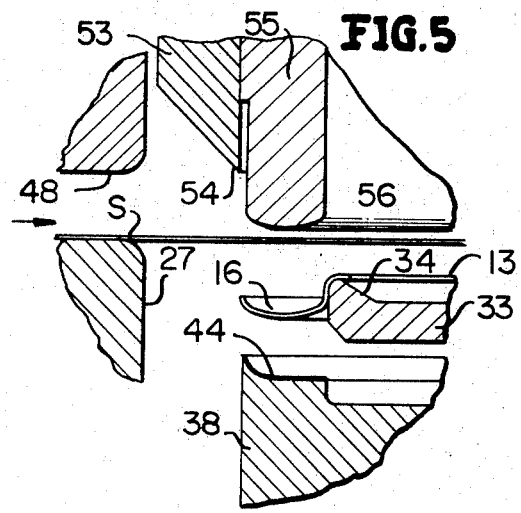
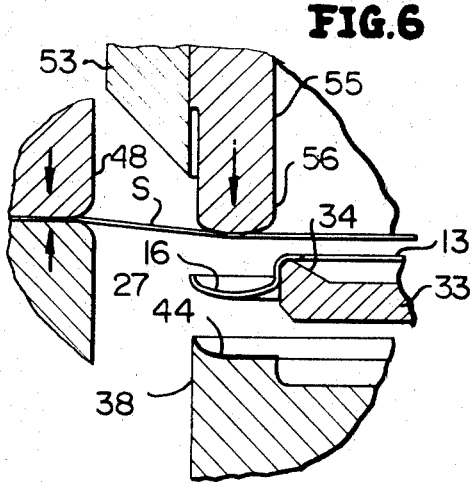
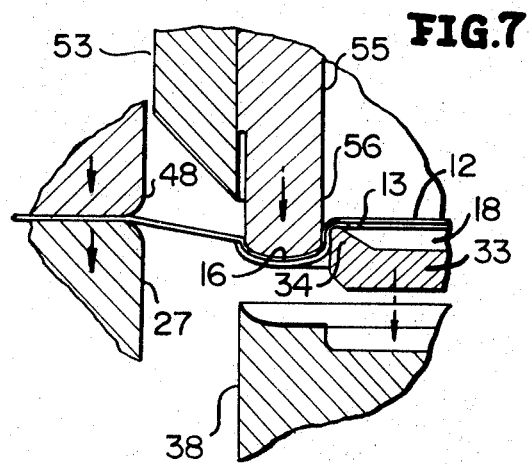
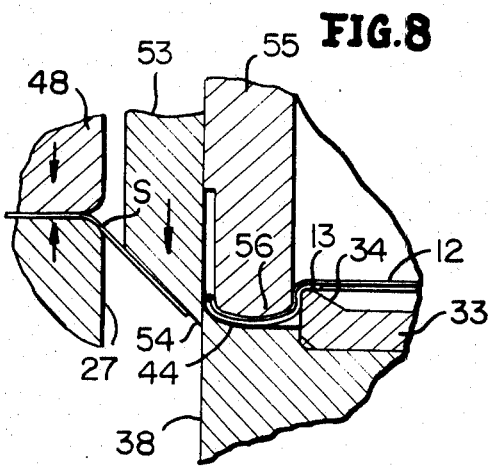
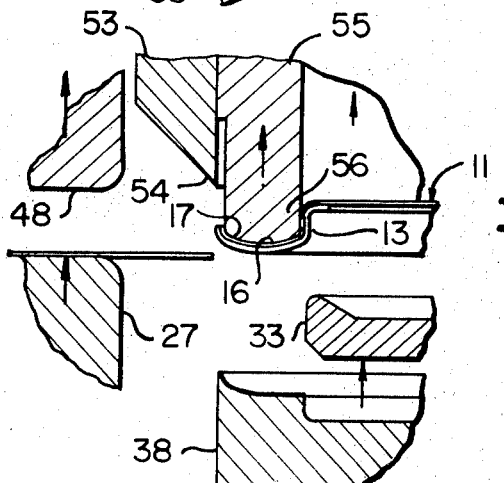

United States Patent Office 3,472,417
Patented Oct. 14, 1969

3,472,417
METHOD OF MAKING WINDOW CAN CLOSURES
James F. Fox, Chicago, Ill., assignor to Continental Can Company, Inc., New York, N.Y., a corporation of New York
Filed Sept. 23, 1966, Ser. No. 581,561
Int. Cl. B65d 7/42
U.S. Cl. 220—67                    12 Claims

ABSTRACT OF THE DISCLOSURE

This relates to a composite can end construction wherein a can end comprises an outer ring and a sheet of thermoplastic material stretched across and joined to the outer ring, and in particular, to a method and apparatus for making composite can end structures having transparent material stretched across an outer ring to provide window can closures.

---

Various types of "window cans" or viewable containers having transparent plastic covers, which enable the ready viewing of products therein are presently available, and are constructed by procedures well known in the prior art.

One of the prior art procedures first prefoms a tansparent window or can end from a rigid or semi-rigid plastic and then bonds a metal rim to the preformed plastic can end, in order that the composite can end obtained may then be seamed to the can by curling the metal rim with a flange on the can. This procedure has been found to be undesirable in that it requires an excessive thickness of plastic for the window, thus raising production costs and increasing the number of required operations.

Another prior art method of providing a "window can" closure resides in placing a sheet of film across the open end of a container with excess plastic extending downwardly along sides of the container and providing a metal ring to be curled with an upstanding flange of the can sidewalls in double-seamed relation, and then removing excess plastic extending beyond the seam. This procedure also has been found to be undesirable in that the assembly procedures for such a can are necessarily slow, particularly in that the excess plastic which protrudes from the double seam must often be trimmed by hand, and there is usually no provision for inserting a sealing compound between the plastic film and the flange of the can body to guarantee a hermetic seal which is of utmost importance when packaging articles such as food products.

The present invention overcomes many of the difficulties of the above-mentioned prior art techniques, in providing a "window-can" end closure which eliminates the necessity of preforming the transparent plastic portion of the end closure, by stretching a sheet of transparent plastic across a preformed rim, bonding the plastic to the rim, removing the excess plastic by cutting away that portion which is used for a given end closure from the remainder of a provided sheet of plastic, double-seaming the ring with a projecting flange of a can body and providing a sealing compound between the can end closure and the flange in order to effect a hermetic seal therebetween.

The above noted method of making a transparent end closure is extremely desirable in that it permits the use of readily available plastic films, such as may be stretched across the metal ring, and which, in their stretched condition provide a can end which is under tension and which therefore provides a neat-appearing transparent closure of substantial strength.

It is therefore an object of this invention to provide a novel method of forming a composite container end by stretching a sheet of bondable plastic material across a ring and securing the peripheral edges of the material to the ring.

It is a further object of this invention to provide a novel method for forming a composite container end by stretching a sheet of heat sealable bondable material across a ring and securing the bondable material to the ring by means of a heat seal while conforming the outer peripheral edges of the bondable material which overlie the ring surface to the configuration of the ring structure.

It is another object of this invention to form a composite container end by stretching a sheet of bondable material across a ring and heat sealing the bondable material to the ring and removing extraneous material which extends outwardly of the ring.

It is yet another object of this invention to provide a novel method of forming a composite container end by restraining a major portion of a sheet of bondable material and by stretching an adjacent portion of the bondable material across a ring and securing the stretched material to the ring by heat sealing and conforming that portion of the bondable material which overlies an adjacent ring portion by pressing the bondable material into a ring groove.

It is still another object of this invention to provide a novel method of forming a composite container by stretching a sheet of bondable material across a ring and securing the bondable material to the ring by means of a heat seal, then treating the composite container end with a sealing compound and attaching the composite container end to a can body by curling outer peripheral portions of the ring to corresponding flange portions of the can body in double-seamed relaton.

It is a further object of this invention to provide a novel container end which is constructed of a metal ring with a sheet of bondable material stretched across and heat sealed to the ring, which container end is attached to a can body by the ring and a can body flange being joined to form a double seam.

It is another object of this invention to provide a novel composite container end constructed of a sheet of plastic material stretched across a metal ring and heat sealed thereto; that portion of the plastic material which overlies the ring being pressed into a conforming configuration with the ring.

It is a further object of this invention to provide a novel apparatus for forming a can end which is particularly adapted to stretch a sheet of bondable material across a ring and for bonding the stretched material to the ring while restraining unstretched portions of the bondable material in clamping engagement.

It is yet another object of this invention to provide a novel apparatus for forming a composite container end which includes a means for stretching a transparent sheet of thermoplastic material across a metallic ring and for forming portions of the bondable material which overlie the ring into conforming engagement with the ring while a cutting means moves first with the forming means and then relative thereto to cut away excess material which extends outwardly of the ring.

With the above, and other objects in view that will hereinafter appear, the nature of the invention will be more clearly understood by reference to the following detailed description, the appended claims, and the several views illustrated in the accompanying drawings.

In the drawings:

FIGURE 1 is a top perspective view of a composite container end of this invention, with a portion thereof broken away for clarity, and illustrates a stretched end closure bonded to and conforming to the configuration of an annular ring.

FIGURE 2 is a fragmentary sectional view of the composite end closure of FIGURE 1, taken along the line 2—2 of FIGURE 1 and illustrates in greater detail the manner in which the plastic end closure conforms to the configuration of the ring and further illustrates a sealing compound applied to that portion of the end closure which conforms to an annular groove of the ring.

FIGURE 3 is a fragmentary sectional view of a container to which a composite container end of this invention has been applied, taken along a line similar to line 2—2 of FIGURE 1, and illustrates an interconnection of the container end and a can body by a curled double-seam with a sealing compound therebetween.

FIGURE 4 is a vertical sectional view of an apparatus particularly adapted to perform the method operations of this invention, and illustrates a sheet of bondable end closure material in overlying relation to one half of a sheet confining means, below a mating half of the sheet confining means with a ring supporting means and heat sealing bonding elements being illustrated inwardly of the sheet confining means below the sheet, and means for forming the configuration of the sheet to that of the ring being illustrated together with a severing means inwardly of the confining means but above the sheet of material.

FIGURE 5 is a fragmentary sectional view of a portion of the apparatus illustrated in FIGURE 4, and illustrates a closure ring being positioned on a support in underlying relation to a material sheet, and a sheet forming and severing means positioned above the material sheet, the apparatus being illustrated in its position prior to bonding material to the ring.

FIGURE 6 is a fragmentary sectional view of the apparatus of FIGURE 4, illustrating a first operational step of the apparatus wherein the confining means are moved together and the forming means are then moved relative to the confining means to stretch the sheet of end closure material towards an end closure ring.

FIGURE 7 is a fragmentary sectional view of the apparatus of FIGURE 4, at a later sequential operational step than that shown in FIGURE 6, and illustrates the sheet of end closure material having been stretched across the ring and being pressed into conforming configuration to the groove of the ring; the confining means, forming means, ring and ring supports being moved vertically downwardly towards a position overlying a heating means.

FIGURE 8 is a fragmentary sectional view of the apparatus of FIGURE 4, at a later sequential operational step than that shown in FIGURE 7, and illustrates the closure ring in position adjacent a heat supplying element and a severing tool cutting away excess portions of end closure material outwardly of the closure ring, while the end closure material and ring are confined between a lower heating support and an upper forming means.

FIGURE 9 is a fragmentary sectional view of the apparatus of FIGURE 4 shown at a final formative stage thereof, after the end closure material which is within the groove of the closure ring has been bonded to the closure ring and the resulting composite container end is removed from the ring support, being carried upwardly with the forming means.

Referring now to the drawings in detail, reference is first made to FIGURE 1, wherein there is illustrated a composite container end 11, comprising an end closure 12 of bondable plastic material and an annular ring 13 of metal or the like. The ring 13 includes an upstanding wall 14 and a flange forming portion 15 having a groove 16 formed on the inner surface thereof. The end closure 12 is in the form of a circular disc having peripheral edge portions 17 thereof, configured to conform to the groove 16 of the ring 13. The end closure 12 is tensioned completely across a circular void 18 of the ring, as by stretching and the peripheral edge portions 17 of the end closure 12 are bonded, as by heat sealing to the groove 16 of the ring 13. A sealing compound 20 is shown disposed on the end closure 12 about the peripheral edge portions 17 thereof.

In FIGURE 3 there is illustrated the interconnection of the composite container end of FIGURES 1 and 2 with a container body 21. The peripheral flange forming portion 15 of the ring 13, with the peripheral edge portion 17 of the end closure 12 bonded in the groove 16 thereof, and with the sealing compound 20 applied to portion 17, is curled with a can body flange 22 into a double-seamed relation, thereby effecting an hermetic seal 23 between the composite container end 11 and the container body 21.

Because the elimination of all head space would void in a container between a transparent container end and the products contained therein is desirable in that products which are immediately adjacent the transparent end closure may be more readily viewable through the transparent closure, the end closure 12 may then be additionally tensioned axially inwardly of the can body 21 as the composite container end 11 is double-seamed onto the container body 21. This can be accomplished by the use of a convex knock-out pad, carried by the double-seamer which contacts the outer surface of the end closure 12 within the area of the void 18 of the ring 13, as the double-seaming is effected, distending the center of the plastic film of the end closure 12 inwardly against the product surface and causing the displaced product to flow toward those corners defined by the junction of the composite container end 11 and the container body 21. This additional tensioning results in a taut, concave shaped composite container end free of voids and air pockets adjacent the transparent end closure 12, but which is also tensioned, and retained in position by the air-tight nature of the seam of the container.

In FIGURE 4 there is illustrated an apparatus for performing the various formative operations of the composite container end 11 comprising upper and lower portions 24, 25 respectviely. Lower base portion 25 includes a base plate 26 upon which is mounted an annular pressure pad lower clamp means 27, secured thereto by means of guide bolts 28 mounted within the sleeves 30. The pressure pad lower clamp means 27 is biased in a vertically upward direction by a means of a plurality of springs 31, and it is limited in vertical upward movement by the engagement of bolt heads 32 of the guide bolts 28 within the pressure pad lower clamp means 27.

Mounted on the base plate 26, inwardly of the pressure pad lower clamp means 27 is a container end support 33 having an annular engaging lip 34. The container end suport 33 is resilintly biased in a vertically upward direction by springs 35 and is limited in vertical displacement from the base plate 26 by guide bolts 36 threaded into the support 33 and having heads 37 in engagement with the base plate 26.

A ring back-up member 38 is provided, having an upper surface thereof positioned slightly below the under surface of the engaging lip 34 of the container end support 33, being secured to the base plate 26 through a heater bottom plate 40 by means of a dowel pin 41. The ring back-up member has a central portion 42 having bores 43 adapted to receive the springs 35 and the guide bolts 36. The ring back-up member 38 includes a ring contoured surface 44 on an upper peripheral surface of an annular ring-like heater housing 45. One or more heating coils 46 are disposed within the heater housing 45 and are adapted to raise the ring 13 and associated peripheral edge portion 17 of the end closure 12 to a desirable bonding temperature.

The upper base portion 24 includes a carrier plate 47 to which an annular pressure pad upper clamp means 48 is secured by means of guide bolts 50 threaded into the upper clamp means 48 and having bolt heads 51 secured to the carrier plate 47. Springs 52, mounted one each about guide bolts 50 bias the upper clamp means 48 away from the carrier plate 47, and the displacement of the upper clamp means 48 from the carrier plate 47 is limited by the bolt heads 51 in engagement with the carrier plate 47.

A cylindrical cutting blade 53, which terminates downwardly in a cutting edge 54 is carried by the carrier plate 47, inwardly of the upper clamp means 48.

A peripheral edge forming member 55 is also carried by the carrier plate 47, positioned inwardly of the cylindrical cutting blade 53. The forming member 55 has an integral downwardly extending annular forming element 56 thereon. The forming member 55 is carried by the carrier plate 47 and is attached thereto by means of guide bolts 57 being threaded into the forming member 55 and having heads 58 thereof secured to the carrier plate 47. A spring 60 is mounted about each guide bolt 57, and the springs 60 are adapted to resiliently bias the forming member 55 away from the carrier plate 47, the displacement of the forming member 55 from the carrier plate 47 being limited by engagement of the heads 58 of the guide bolts 57 in the carrier plate 47.

The carrier plate 47 also has a vacuum connection 61 attached thereto, communicating with a cylindrical void 62 in a stop-ring 63 disposed above the forming member 55, with a cylindrical void 64 in the forming member 55, and with an enlarged cylindrical void 65 within the forming member 55 adjacent the forming element 56. The vacuum connection 61 is adapted to provide a source for retaining the composite container end 11 adjacent the forming element 50 after the formative steps on the composite container end are completed.

The annular pressure pad upper and lower clamp means 27 and 48 respectively, the container end support 33, the ring back-up member 38, the annular ring-like heater housing 45, the heater bottom plate 40, the cylindrical cutting blade 53, the peripheral edge forming member 55 and the stop ring 63 are all concentrically mounted at close tolerances in order to permit cooperating elements to be properly aligned during the various formative stages of the composite container ends.

Operation

In FIGURE 5 there is illustrated a fragmentary view of the major operative components of this apparatus. A ring 13 is shown positioned on the container end support 33, being supported by the engaging lip 34 of the support 33. The ring 13 is illustrated with its groove 16 facing upwardly, in an inverted position from that shown in FIGURE 2. A sheet S of bondable material is illustrated in position on the pressure pad clamp means 27, having been fed into overlying relation to the ring 13 from the left, in the direction of the arrow in FIGURE 5. The annular pressure pad upper clamp means 48, the cylindrical cutting blade 53 and the forming member 55 are positioned above the sheet S in an inoperative position. The container end support 33 is in its uppermost position above the ring back-up member 38 in this position of the forming member 55.

In FIGURE 6 there is illustrated the next consecutive operational step from that illustrated in FIGURE 5, wherein the upper base portion 24 is moved vertically downwardly carrying the pressure pad upper clamp means 48, the cylindrical cutting blade 53 and the forming member 55. In this position the pressure pad upper clamp means 48 is shown to descend to contact the sheet S and to clampingly confine the sheet S as the upper clamp means descends, into clamping engagement with the lower clamp means 27. As the upper clamp means 48 descends to the position illustrated in FIGURE 6, the forming element 56 of the forming member 55 contacts the sheet S, displacing a portion of the sheet located inwardly of the forming member 55 vertically downwardly from that portion of the sheet S which is confined between clamping means 48 and 27.

In FIGURE 7 there is illustrated the relative position of various operative components of this apparatus during continued downward movement of the upper base portion 24, such that, during the downward movement of the base portion 24, carrying the pressure pad upper clamp means 48, the annular cutting blade 53 and the forming member 55; the pressure pad lower clamp means 27, in contacting engagement with upper clamp means 48 is also caused to move vertically downwardly while the vertically downwardly moving forming element 56 of the forming member 55 in contacting engagement with the sheet S also moves vertically downwardly until an annular portion of the sheet S beneath the forming element 56 fills the groove 16 of the ring 13, thereby stretching an end closure portion 12 of the sheet S across the circular void 18 of the ring 13. This stretching of the end closure portion 12 of the sheet S places all incremental portions of the end closure portion 12 under equal tension forces, thereby eliminating wrinkles and the like from end closure portion 15 of the sheet S.

In the position illustrated in FIGURE 7, the clamping means 48, 27 are in their lowermost positions, in that springs 31 have been compressed to allow the downward movement of clamp means 27, until the lower surface of the clamp means 27 abuts against sleeves 30 which limit the downward movement of the clamp means 27. The upper base portion 24 then moves vertically downward carrying the cylindrical cutting blade 53 and forming member 55, relative to the clamp means 48, 27, necessitating the compression of the springs 52, to enable such relative movement. The cylindrical cutting blade and the forming member 55 move in unison with the container end support 33, with the ring 13 confined between the forming element 56 and the engaging lip 34 of the end support 33. These vertically downwardly moving elements thereby compress springs 35 beneath the container end support 33, as their downward displacement continues toward the ring back-up member 38.

In FIGURE 8 there is illustrated an extreme downward position of the forming member 55 and container end support 33, where the flange forming portion 15 of the ring 13 is in abutting relation against the ring contoured surface 44 of the ring back-up member 38. In this lowermost position of the forming member 55 and support 33 the forming element 56 cooperates with the ring contoured surface 44 of the ring back-up member 38 to compress the peripheral edge portion 17 of the end closure portion 12 of the sheet S within the groove 16 of the ring 13, concurrently with the application of a sufficient amount of heat from the heating coils 46 to bond the peripheral portion 17 of the end closure 12 to the surface of the groove 16 of the ring 13. The heat from the coils 46 is readily transmitted to the portion 17 of the end closure 12 of the sheet S through the flange forming portion 15 of the ring 13, due to the conforming contour of the ring contoured surface 44 immediately below the ring 13.

While the forming member 55 is in its lowermost position as shown in FIGURE 8, the upper base portion 24 is moved further downwardly, during which downward movement the springs 60 are compressed, as are the springs 52 compressed in order to facilitate relative vertical motion between the cylindrical cutting blade 53 and the forming member 55 and upper clamp means 48. As the cylindrical cutting blade is moved vertically downward past the flange forming portion 15 of the ring 13, the cutting edge 54 of the cutting blade 53 cuts a cylindrical slit in the sheet S, entirely around the ring 13, thereby separating the end closure portion 12 of the sheet S from the remainder of the sheet S and removing the extraneous material of the sheet S from the end closure portion 12. In this position the composite container end 11 is completely formed.

In FIGURE 9 there is illustrated a final operational step of the apparatus of this invention, wherein upper and lower clamp means 48, 27, end support 33, the cylindrical cutting blade 53, and the forming member 55 are moved vertically upward, as the upper base portion 24 is moved upward, their respective associated compression springs thereby expanding to return each of the elements to their respective original positions, as illustrated in FIGURE 5. The composite container end 11 is retained across the end of the forming member 55, with the forming element 56 positioned within the groove 16 of the ring 13, with the bonded peripheral portion 17 of the end closure 12 therebetween. The composite container end 11 is retained across the end of the forming member 55 by a partial vacuum which is drawn through the vacuum connection 61 and through the cylindrical voids 62 and 64 of the stop ring 63 and forming member 55 respectively.

After the composite container end 11 is lifted from the ring back-up member or die 38, the composite container end 11 may then be readily removed, have a sealing compound 20 applied thereto and be double-seamed to a container body flange 22 of a container body 21. The central portion of the end closure 12 may simultaneously with the double-seaming operation be subjected to an additional tensioning as has been heretofore described, and as is illustrated in FIGURE 3.

The springs are precisely calibrated to yield or deflect under a predetermined force, in order to result in a desired tensioning of the end closure 12, in accordance with the particular material of the sheet S being used. Also, the springs are of predetermined calibration to result in a desired deflection under a desired load in order to achieve the relative movements of the various vertically movable members.

The ring 13 may be of any desired material, such as metal or rigid plastic, but metal rings in particular have been found to be most desirable, due to the particular ductility and strength of metal.

The material which is used for the end closure 12 is most desirably a flexible plastic film of single thickness, but may be of a plurality of thicknesses, utilizing a combination of different materials. In their preferred embodiment of this invention, a laminate of Mylar-saran is used which gives maximum protection against moisture vapor and transmission of oxygen through the material, in which case it has been found desirable to coat the metal ring with a clear vinyl lacquer in order to facilitate the maximum bonding or adhesion between the ring 13 and the end closure 12. Other plastic materials such as Mylar-polyethylene and Mylar-polypropylene have also been used successively. However, because of the particular nature of Mylar-saran, in being capable of being heat shrunk and having no apparent change in the clarity of the film under processing temperatures in the general range of 250° Fahrenheit, this particular material has been found to be most desirable. However, where the possibility of the end closure 12 of transmitting oxygen therethrough is not critical, and where a somewhat more cloudy transparent end closure is permissible, Mylar-polyethylene and Mylar-polypropylene may also be used with satisfactory success.

Where visibility through the end closure 12 is not essential, the sheet S could be a laminate of plastic and metal foil or various other combinations, such as plastic, fibre and foil, such as may be desired.

Although only preferred embodiments of the invention have been illustrated and described herein, it is to be understood that various modifications may be made in this invention, within the spirit of this invention.

What is claimed is:

1. A method of forming a composite container end comprising the steps of providing a container end ring having a central opening, positioning the end ring in spaced relation relative to a sheet of bondable material supported and restrained outwardly of the end ring, moving an intermediate portion of said bondable material towards said end ring thereby streaching the bondable material, and then securing said stretched bondable material to said end ring.

2. The method of claim 1 wherein said bondable material is a heat-sealable thermoplastic and the ring is a metallic material; said securing step comprising heat sealing said bondable material to the said ring.

3. The method of claim 1 wherein said securing step includes conforming the bondable material adjacent the ring to the configuration of the ring material.

4. The method of claim 1 together with the step of additionally stretching said bondable material axially inwardly relative to said end ring to a concavo-convex configuration.

5. The method of claim 1 together with the step of additionally stretching said bondable material axially inwardly relative to said end ring to a concavo-convex configuration by axially inwardly deflecting that portion of said end ring surroundig said central opening.

6. The method of claim 1 wherein said stretching comprises pressing a circumferential annular portion of said unrestrained portion of the bondable material into a circumferential groove on said ring.

7. The method of claim 6 wherein said securing step includes conforming the bondable material adjacent the ring to the configuration of the ring material within said ring groove.

8. The method of claim 1 including the step of curling said ring and adjacent bonded material circumferentially and peripherally attaching the composite structure to a container body flange.

9. The method of claim 8 including the step of lining the composite container end with a sealing compound prior to attaching the composite container end to the container body.

10. The method of claim 8 wherein said composite structure is attached to said container body by a seaming operation concurrently with an additional stretching of said bondable material axially inwardly of said container body in concavo-convex configuration adjacent a product contained within the container.

11. A composite container end comprising a ring and a sheet of bondable material overlying the opening in said ring and secured at its outer peripheral surface portion to said ring, said bondable material being in its entirety under tension in all radial directions thereof including that portion thereof secured to said ring.

12. The composite container end of claim 11 wherein said bondable material has a peripheral edge coextensive with the peripheral edge of said ring.

References Cited

UNITED STATES PATENTS

| 1,547,080 | 7/1925 | Swan | 220—82 |
| 1,765,383 | 6/1930 | Punte | 220—82 |
| 2,154,349 | 4/1939 | O'Brien | 220—81 |
| 3,342,367 | 9/1967 | Irland | 220—82 X |

FOREIGN PATENTS

| 320,181 | 8/1934 | Italy. |
| 462,301 | 3/1951 | Italy. |
| 519,771 | 3/1955 | Italy. |

JOSEPH R. LECLAIR, Primary Examiner

J. R. GARRETT, Assistant Examiner

U.S. Cl. X.R.

113—121; 220—82